No. 693,922. Patented Feb. 25, 1902.
C. STONE.
FEEDING DEVICE FOR FABRIC CUTTING MACHINES.
(Application filed June 19, 1901.)
(No Model.)
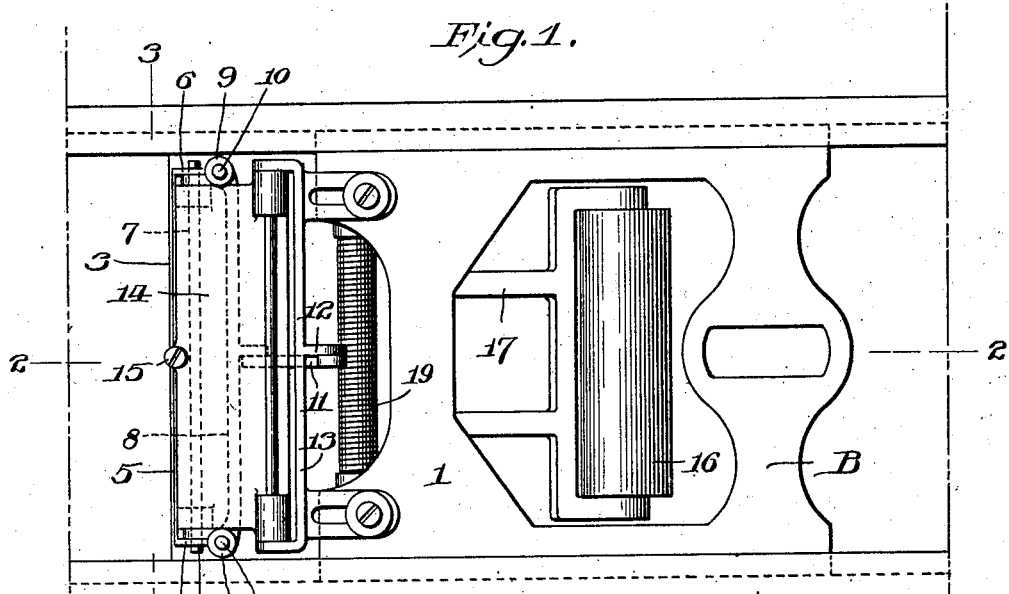
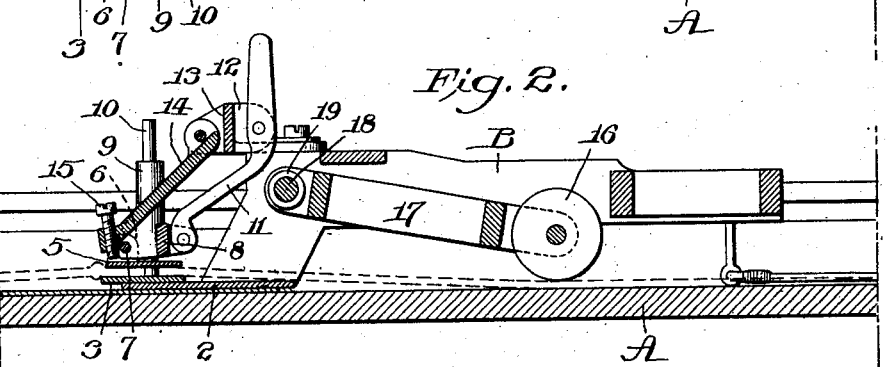
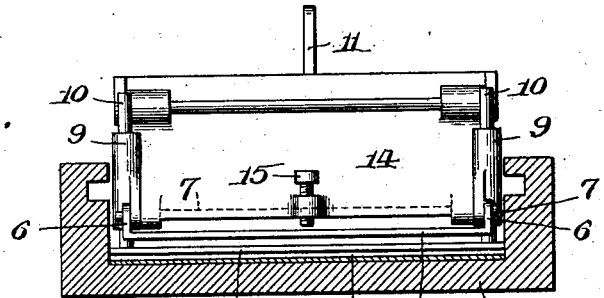
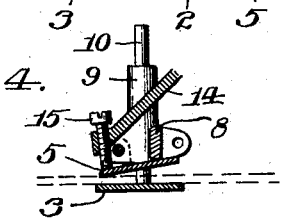
WITNESSES:
INVENTOR
Clarence Stone
BY
John R. Nolan
ATTORNEY.
THE NORRIS PETERS CO., PHOTO-LITHO., WASHINGTON, D. C.

UNITED STATES PATENT OFFICE.

CLARENCE STONE, OF PHILADELPHIA, PENNSYLVANIA, ASSIGNOR TO ADAMS TOP CUTTING MACHINE COMPANY, OF NEW YORK, N. Y., A CORPORATION OF NEW JERSEY.

FEEDING DEVICE FOR FABRIC-CUTTING MACHINES.

SPECIFICATION forming part of Letters Patent No. 693,922, dated February 25, 1902.

Application filed June 19, 1901. Serial No. 65,094. (No model.)

*To all whom it may concern:*

Be it known that I, CLARENCE STONE, a citizen of the United States, residing in the city and county of Philadelphia, in the State of Pennsylvania, have invented certain new and useful Improvements in Feeding Devices for Fabric-Cutting Machines, of which the following is a full, clear, and exact description, reference being had to the accompanying drawings, forming a part of this specification.

This invention relates generally to that class of fabric-cutting machines whereby a flat tubular web is severed into predetermined lengths—such, for example, as illustrated in United States Letters Patent to Charles F. Adams and Henry F. Adams, No. 572,094, dated December 1, 1896, and No. 616,280, dated December 20, 1898—having reference especially to the reciprocating carrier or feeder device whereby the fabric is progressively clamped and fed to the knife or severing device. Heretofore the carrier included in its construction a forward lower jaw, which was fixed in respect to the carrier, and an upper coacting movable jaw, which was constructed and arranged to bear upon the fabric interposed between the two jaws, the forward or acting edges of the latter biting and clamping said fabric during the forward or feeding stroke of the carrier, yet permitting said carrier to slide freely upon the fabric during the backward stroke of the device. Owing to the fixed relation of the lower jaw to the carrier the forward edge of the upper jaw was projected in advance of the opposing edge of the former jaw to a greater or less extent, as determined by the thickness of the interposed fabric, thereby correspondingly affecting the efficiency of the clamping action of the jaws. To overcome this defect is the primary object of my invention. Accordingly I mount the lower jaw movably on the carrier and connect the same with the movable upper jaw in such a manner that the two jaws are simultaneously and correspondingly advanced or retracted during the opening and closing, respectively, of the upper jaw, so as to maintain the forward edges of the two jaws in the same relation vertically to each other irrespective of the thickness of the interposed fabric.

The invention also includes novel features of construction, which will be hereinafter particularly described and claimed.

In the drawings, Figure 1 is a plan of a fabric-feeder embodying my invention, showing the same as mounted on the table of the fabric-cutting machine. Fig. 2 is a vertical section as on the line 2 2 of Fig. 1. Fig. 3 is a transverse section as on the line 3 3 of Fig. 1. Fig. 4 is a sectional detail of the clamping-jaws, showing the adjustment of the upper jaw.

A represents the table of the machine, and B the reciprocative fabric-feeder horizontally supported and guided thereon, as usual. This feeder comprises a skeleton frame 1, at the forward lower portion of which is provided a basal bearing-surface 2 for a horizontally-movable plate 3, which constitutes the lower clamping-jaw. The upper coacting clamping-jaw comprises a plate 5, with upwardly-projecting end lugs 6, which are hung loosely on a cross-rod 7, supported in forwardly-projecting lugs on a vertically-movable frame, said frame comprising a cross-bar 8, provided at its ends with vertically-perforated guides 9, through which freely extend guide-posts 10, rising fixedly from the respective ends of the lower jaw. The cross-bar 8 is pivotally connected at a point midway between its ends with the lower extremity of a link or lever 11, which is fulcrumed to a rearwardly-extending lug 12 on a transverse cross-bar or bracket 13, mounted, preferably adjustably, on the frame 1 of the fabric-feeder. The upper extension or arm of this link or lever affords a thumb-piece, by manipulation of which the frame, with its appurtenances, may be readily raised or lowered, as desired. On the forward side of the bracket 13 is pivoted the upper end of an inclined plate 14, the lower end whereof is pivotally connected to the bar 8 by the cross-rod 7, said plate thus firmly supporting and guiding the frame 8 9 in the vertical movement of the latter, and also, by its weight, causing said frame, with its attached jaw, to drop normally to clamping position.

By the above-described construction it will be seen that during the upward and downward movement of the upper jaw the lower jaw, through its vertically-sliding connection with the former, is moved forward and backward concurrently with the corresponding movements of the upper jaw, thus maintaining the forward or acting edges of the two jaws in the same relation vertically to each other, irrespective of the thickness of the interposed fabric. Hence during the advancement of the feeder the acting edges of its clamping members take squarely against the opposing welt in the interposed fabric in a manner to effectually grip the latter and feed it forwardly to the cutter. (See Fig. 2.) It will also be seen that the independent rocking or tilting movement of the upper jaw permits its forward edge to tilt downwardly to insure its better engagement with the fabric.

As a simple and efficient means to adapt the feeder for use upon plain fabrics devoid of welts, I provide the plate 14 with a set-screw 15, which is so disposed as to bear upon the forward portion of the upper jaw, to the end that by proper manipulation of the screw the forward edge of the jaw may be tilted downward and maintained in that position, as illustrated in Fig. 4.

A fabric pressure-roll 16 is carried by the free end of a vibratory frame 17, fulcrumed to a cross-rod 18, supported in the carrier-frame in rear of the clamping-jaws, the roller-bearing end of said frame being maintained yieldingly depressed by the action of a suitably-disposed spring 19 on the cross-rod.

I claim—

1. In a feeder for fabric-cutting machines, the combination with the frame or support, of an independent lower jaw horizontally movable thereon, an upper jaw movable vertically toward and from the lower jaw, and a sliding connection between said jaws, substantially as described.

2. In a feeder for fabric-cutting machines, the combination with the frame or support, of an independent lower jaw horizontally movable thereon, a frame or support movable vertically toward and from the lower jaw, a coacting jaw on said latter frame or support, and a sliding connection between said latter frame or support and the lower jaw, substantially as described.

3. In a feeder for fabric-cutting machines, the combination with the frame or support, of an independently-movable lower jaw thereon, posts on said jaw, a superposed frame movable toward and from said jaw, guides on said frame for the said posts, and a jaw on said frame, substantially as described.

4. In a feeder for fabric-cutting machines, the combination with the frame or support, of an independently-movable lower jaw thereon, a frame or support movable vertically toward and from the lower jaw, a coacting jaw on said latter frame or support, a sliding connection between said frame or support and the lower jaw, a plate or member pivotally connecting the two frames or supports, and a link or lever also pivotally connecting said frames or supports, substantially as described.

5. In a feeder for fabric-cutting machines, the combination with the frame or support, of an independently-movable lower jaw thereon, a frame or support, a coacting upper jaw pivoted thereon, a sliding connection between said latter frame or support and the lower jaw, a plate or member pivotally connecting the two frames or supports, adjusting means in said plate adapted to bear upon the forward portion of the upper jaw, and a link or lever also pivotally connecting said frames or supports, substantially as described.

6. In a feeder for fabric-cutting machines, the combination with the frame or support, of an independently-movable lower jaw thereon, a frame or support, a coacting upper jaw pivoted thereon, a sliding connection between said latter frame or support and the lower jaw, a plate or member pivotally connecting the two frames or supports, a set-screw in said plate adapted to bear upon the forward portion of the upper jaw, and a link or lever also pivotally connecting said frames or supports, substantially as described.

In testimony whereof I have hereunto affixed my signature in the presence of two subscribing witnesses.

CLARENCE STONE.

Witnesses:
ANDREW V. GROUPE,
JOHN R. NOLAN.